US011467005B2

(12) United States Patent
Antraygue

(10) Patent No.: US 11,467,005 B2
(45) Date of Patent: Oct. 11, 2022

(54) REDUNDANT VDT WITH DC INTERFACE

(71) Applicant: Ratier-Figeac SAS, Figeac (FR)

(72) Inventor: Cédric Antraygue, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 233 days.

(21) Appl. No.: 16/665,105

(22) Filed: Oct. 28, 2019

(65) Prior Publication Data

US 2020/0240813 A1 Jul. 30, 2020

(30) Foreign Application Priority Data

Jan. 28, 2019 (EP) .................................... 19290008

(51) Int. Cl.
*G01D 5/22* (2006.01)
*H01F 21/04* (2006.01)

(52) U.S. Cl.
CPC ........... *G01D 5/2291* (2013.01); *H01F 21/04* (2013.01)

(58) Field of Classification Search
None
See application file for complete search history.

(56) References Cited

U.S. PATENT DOCUMENTS

| 3,600,669 A | 8/1971 | McClain |
| 4,100,480 A | 7/1978 | Lytle et al. |
| 5,414,939 A * | 5/1995 | Waugaman ............ G01B 7/125 209/531 |
| 5,615,225 A | 3/1997 | Foster et al. |
| 6,043,644 A | 3/2000 | De Coulon et al. |
| 8,542,008 B2 * | 9/2013 | Nakano ................ G01D 5/2291 324/207.18 |
| 8,692,541 B2 * | 4/2014 | Nyce .................... G01D 5/2291 324/207.16 |
| 10,137,997 B2 | 11/2018 | Nouhaud |
| 2002/0071298 A1 | 6/2002 | Pennell |
| 2016/0214730 A1* | 7/2016 | Nou ....................... B64D 31/04 |
| 2016/0238412 A1* | 8/2016 | Germann ............... G01D 5/204 |
| 2017/0241810 A1 | 8/2017 | Keohane et al. |
| 2018/0038714 A1* | 2/2018 | Sloat .................... G01D 5/2291 |

OTHER PUBLICATIONS

Extended European Search Report for International Application No. 19290008.2 dated Jul. 11, 2019, 7 pages.

* cited by examiner

*Primary Examiner* — Nasima Monsur
(74) *Attorney, Agent, or Firm* — Cantor Colburn LLP

(57) ABSTRACT

A position sensing system for sensing a position of an input shaft of a variable differential transformer (VDT), comprising said VDT, which comprises first and second AC signal output means that are configured to output a first AC output signal and a second AC output signal respectively. The sensing system further comprises AC/DC converting means configured to convert said first AC output signal to a first DC output signal and an AC/DC converting means configured to convert said second AC output signal to a second DC signal. The first and second DC output signals each indicate an individual position of said input shaft.

12 Claims, 3 Drawing Sheets

REDUNDANT VDT WITH DC INTERFACE

FOREIGN PRIORITY

This application claims priority to European Patent Application No. 19290008.2 filed Jan. 28, 2019, the entire contents of which is incorporated herein by reference.

TECHNICAL FIELD

The examples described herein relate to sensors. In particular, the examples described herein relate to position sensors that may be used to sense the position of a second component such as a component of a pilot control (e.g. a side stick unit or a thrust control assembly). Other uses are, however, envisaged. The examples also relate to methods for sensing or detecting a position of a second component.

BACKGROUND OF THE INVENTION

Potentiometers are commonly used in aircraft pilot control units (such as in side stick units, thrust control assemblies etc.) as position feedback to aircraft systems (such as flight control systems, engine control systems etc.). These devices present the advantages that they are simple in terms of their electrical interface (analogue DC voltages) and they are also stackable in a limited volume so that they can easily present multiple outputs in a small envelope. For example, 4 outputs on a single shaft may be provided. In some examples, 2 or 3 outputs are also used.

Although such potentiometers provide these advantages, it would be further advantageous if the wear and endurance of such devices were also able to be improved.

SUMMARY OF THE INVENTION

A position sensing system for sensing a position of an input shaft of a variable differential transformer (VDT) is described herein comprising a VDT that comprises first and second AC signal output means that are configured to output a first AC output signal and a second AC output signal. The sensing system further comprises a first AC/DC converting means that is configured to convert said first AC output signal to a first DC output signal; and a second AC/DC converting means that is configured to convert said second AC output signal to a second DC signal. The first and second DC output signals each indicate an individual position of said input shaft.

In any or some of the examples described herein, each of said AC/DC converting means that is configured to output said first and second DC output signals may comprise a RMS to DC convertor or a peak detector.

In any or some of the examples described herein the position sensing system may further comprise a DC input connected to said VDT.

In any or some of the examples described herein the position sensing may further comprise a lightning and electromagnetic interference protection unit connected between said DC input and said VDT.

In any or some of the examples described herein the system may further comprise an AC excitation generation unit positioned between said DC input and said VDT that is configured to condition said DC input to provide AC excitation to said VDT.

In any or some of the examples described herein said VDT may further comprise a primary coil configured to provide a magnetic field, and a first and second secondary coils electromagnetically coupled to the primary coil. Movement of said input shaft varies a voltage induced by each of the secondary coils and these varied induced voltages may thereby indicate said positions of said shaft.

In any or some of the examples described herein said first AC output means may be connected to a first output circuit and said second AC output means is may be connected to a second output circuit. The first AC/DC converting means may be provided on said first output circuit and said second AC/DC converting means may be provided on said second output circuit.

In any or some of the examples described herein each output circuit may further comprise a gain calibration unit.

In any or some of the examples described herein each gain calibration unit may be operatively connected to a thermistor to adjust the output gain of the gain calibration unit.

In any or some of the examples described herein each output circuit may further comprise an offset calibration unit.

Any or some of the examples described may be used in combination with a pilot control unit that comprises the position sensing systems described herein. In one example, the shaft may be connected to a component of said pilot control unit, and said position of said shaft may indicate a position of said component of said pilot control unit.

The position detection system described herein may comprise a DC input into a variable differential transformer, VDT. The VDT may be operatively connected to the DC input, and the VDT may be configured to output at least two DC outputs.

In some examples, the system may also be configured to output more than two DC outputs.

The systems and methods may further comprise a lightning and electromagnetic interference protection unit.

In some examples, the VDT may be a rotary variable differential transformer, RVDT. Alternatively, the VDT may be a duplex, triplex, quadruplex, or any other RVDT presenting additional outputs on a single shaft. It is also envisaged that the VDT may be a linear variable differential transformer, LVDT, presenting any number of outputs on a single shaft.

Any of the systems as described herein may further comprise one or more than one DC/AC converter configured to convert DC voltage from the DC input to AC voltage.

The input shaft of the VDT may be configured to be connected to a pilot control unit. For example, the input shaft may be connected to a side stick unit.

The VDT may further comprise a primary coil configured to provide a magnetic field, and at least two secondary coils electromagnetically coupled to the primary coil, and movement of the input shaft may vary a voltage induced by each of the secondary coils. Each secondary coil may be connected to an output circuit comprising an AC/DC converter, which may provide one of the at least two DC outputs.

A method for detecting a position of an input shaft of a variable differential transformer (VDT) is also described herein. The VDT may comprise first and second AC signal output means that are configured to output a first AC output signal and a second AC output signal. The method comprises converting said first AC output signal to a first DC output signal and converting said second AC output signal to a second DC signal, wherein said first and second DC output signals each indicate an individual position of said input shaft.

In any or some of the examples described herein the method may further comprise providing a DC input to said VDT and generating an AC input from said DC input and supplying said AC input to said VDT.

In any or some of the examples described herein the VDT may further comprise a primary coil that configured to provide a magnetic field, and at first and second secondary coils electromagnetically coupled to the primary coil, and movement of said input shaft may vary a voltage induced by each of the secondary coils. The varied induced voltages may thereby indicate said positions of said shaft. The method may further comprise connecting said first AC output means to a first output circuit and connecting said second AC output means to a second output circuit and providing said first AC/DC converting means on said first output circuit and providing said second AC/DC converting means on said second output circuit.

In any or some of the examples described each output circuit may further comprise a gain calibration unit and/or an offset calibration unit.

The methods may further comprise providing any of the structural features of the systems described herein in combination or isolation.

The methods described herein may comprise providing a DC voltage input to a VDT, and providing, from the VDT, at least two DC outputs.

The method may further comprise the steps of generating a magnetic field by a primary coil of the VDT, inducing a voltage in at least one secondary coil of the VDT. Moving an input shaft of the VDT may vary the voltage induced in the at least one secondary coil of the VDT. The method may also comprise converting the DC voltage input to AC voltage input to the VDT.

Further, the method may comprise the step of converting the induced voltage in at least one secondary coil to a DC output voltage. The method may also provide calibrating the offset of the DC output voltage, and calibrating the gain of the DC output voltage.

DETAILED DESCRIPTION OF THE INVENTION

Potentiometers are commonly used in aircraft pilot control units (such as in side stick units, thrust control assemblies etc.) as continuous position sensing feedback to aircraft systems (such as flight control systems, engine control systems etc.). These devices are able to provide 2, 3 or 4 outputs on a single shaft.

Figure 1:
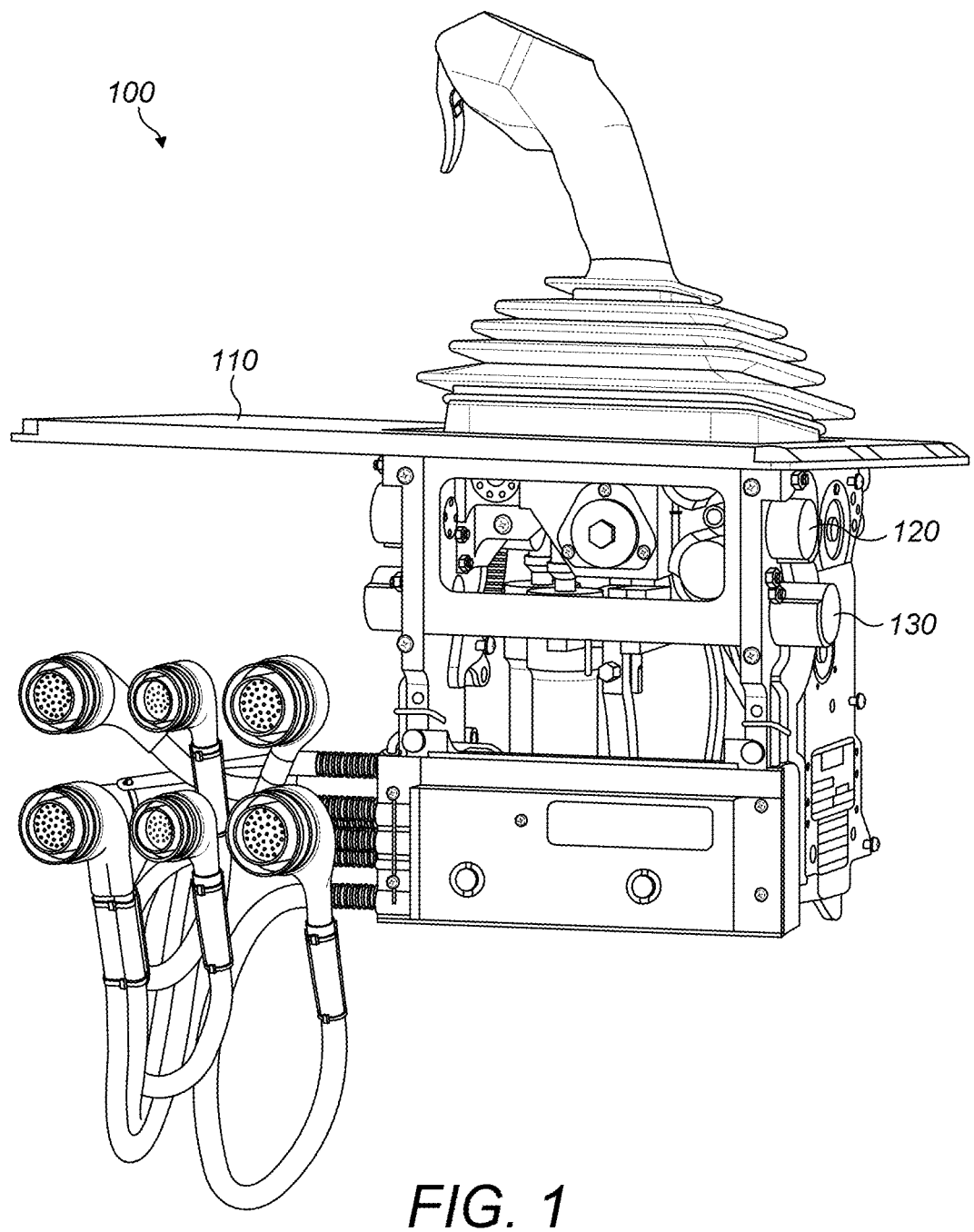
FIG. 1 depicts a schematic diagram of a known position sensor.

FIG. 1 provides an overview of a known position sensor 100 showing a side stick unit 110, a three tracks potentiometer 120 and a four tracks potentiometer 130. For ease of reference, the position sensors disclosed herein will be described with reference to a pilot control/equipment such as a side stick unit. However, it is envisaged that the position sensors may be utilised with other pieces of equipment and in other technical fields. The new types of position sensing systems described herein could be used in such pilot controls, as well as other types of controls that may require position sensing.

As is known in the art, a potentiometer is made of a conductive plastic track (for infinite resolution and low electrical noise) attached to a potentiometer housing. A metal wiper (multi-fingered) is attached to a potentiometer shaft and the metal wiper rotates and slides onto a resistive track. A slip ring is used to electrically connect the rotating wiper onto the housing.

It has been found, however, that a main drawback of the potentiometers that are currently used in position sensors (such as those found in pilot controls, for example) is due to this contact between their wiper and their resistive track, in that this contact between the wiper and resistive track results in wearing of the track during the rotation of the wiper. The endurance of the sensor is therefore reduced.

This wearing can lead to many negative results including a) loss of performance (e.g. decreased accuracy and/or increased noise), b) in some cases a partial loss of contact inducing output voltage drop (and therefore an increase in contact resistance), c) in other cases a complete loss of contact (and therefore no more output signal).

The examples described herein aim to overcome these disadvantages to produce an improved position sensing system that does not wear as quickly and that has greater endurance. The examples described herein aim to overcome these issues with known contactless sensors by providing a contactless sensing system for use in a pilot control that is much smaller than those commonly used in aerospace applications, and may be provided with a DC interface. Such an interface may also advantageously be utilised with a DC potentiometer interface.

This is achieved in the examples described herein by replacing the potentiometer that is used in standard position sensors with a new type of contactless sensing system that comprises a VDT that is utilised and conditioned in ways not known in current systems. Although the examples described herein are shown with the use of a RVDT, the examples are not limited to this and the devices, systems and methods described may be used with other types of variable differential transducers (VDTs).

Although the use of some contactless inductive sensors is known in the general field of aerospace, (e.g. rotary variable differential transformers (RVDTs) are commonly used in aerospace applications for other uses), typically it has not been desirable or even possible to use such sensors in a pilot control. This is because known RVDTs capable of presenting several outputs on a single shaft are significantly larger in size than potentiometers. There would therefore not be enough room in the pilot control to incorporate such sensors. The examples described herein, however, are also able to overcome these issues.

RVDTs are basic differential sensors comprising a rotating iron core, and a stator assembly attached to a housing which contains electromagnetic components such as an excitation/primary coil and a pair of output/secondary coils. The output coils are wound into a stationary iron flux path. In operation, a fixed frequency AC voltage is applied to the primary stator coil, generating a magnetic field. The rotating iron core then acts as a flux director that electromagnetically couples the primary coil to the secondary coils. The electromagnetic coupling is proportional to the angular displacement of rotor/iron core.

Figure 2:
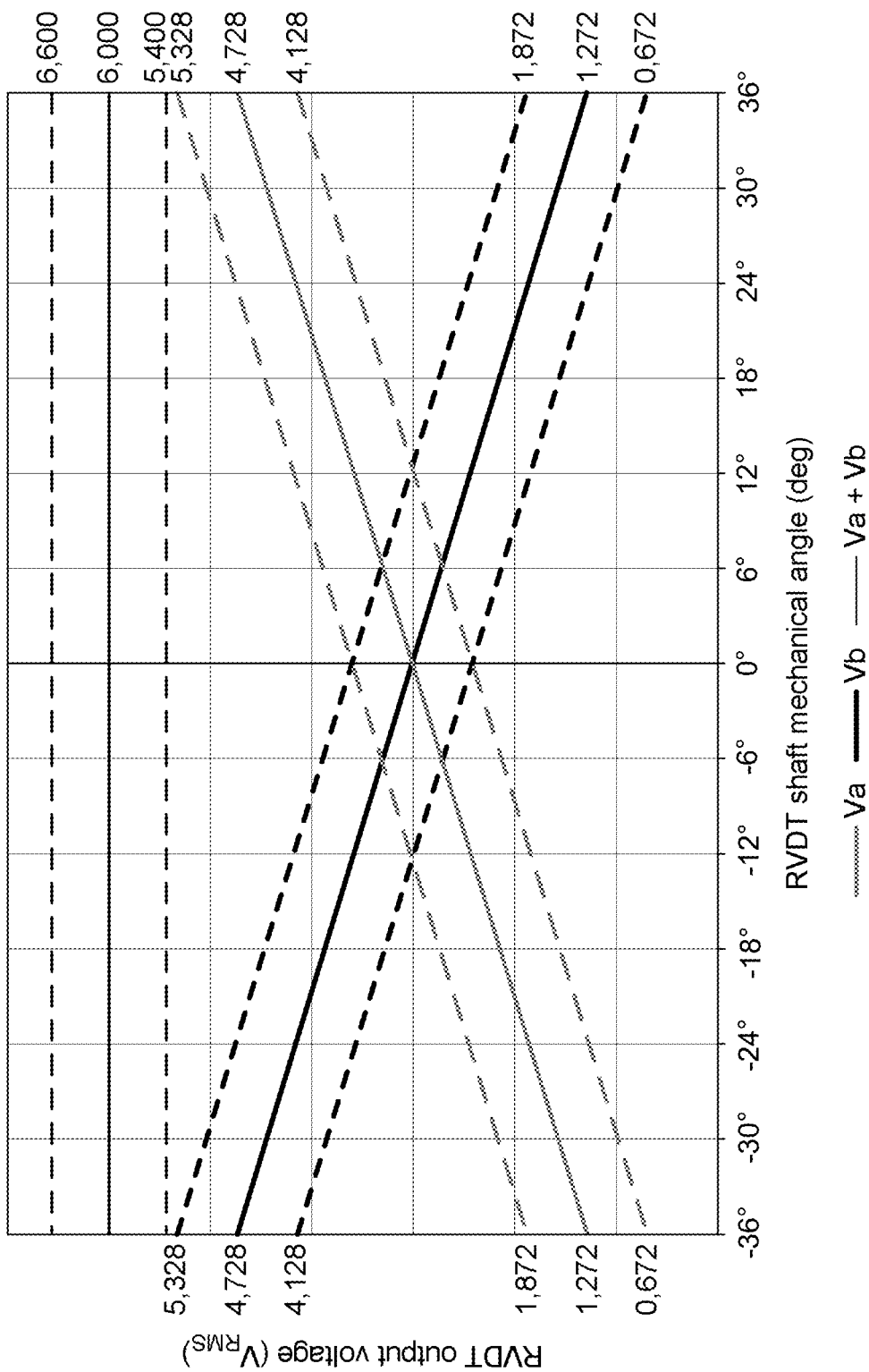
FIG. 2 depicts the variation in output of two RVDT secondary coils against the RVDT shaft angle.

An output of the secondary coils against the angle of the RVDT shaft (which determines the angle of the rotating iron core, and thereby the direction of the flux), along with the tolerances of each output signal is seen in FIG. 2. The line Va represents the voltage output of the first secondary coil, and the line Vb represents the voltage output of the second secondary coil. As can be seen, the voltage across each secondary coil linearly varies with a change of angle of the RVDT shaft. The output of each secondary coil may be inversely proportional to the output of the other secondary coil. The sum of the output of the two secondary coils may be constant, as may be seen in FIG. 2.

A classical way of conditioning the output of the two secondary coils in an RVDT is to calculate a ratiometric gain of the output. Such a method consists of using the difference over the sum gain, i.e.

$$\left(\frac{Va - Vb}{Va + Vb}\right),$$

and utilising the resulting ratiometric gain in order to indicate the angle of the RVDT shaft.

Such a method of conditioning may naturally compensate the effect of temperature which can affect the gain of the sensor outputs, as well as allowing for the monitoring of the sensor verifying that the sum of the Va+Vb voltage is within a determined range. Software is often used to determine such a ratiometric gain; however, this requires long wiring between the computer and the unit comprising the RVDT. Further, when software is not used, the ratiometric gain method can add errors and thermal drifts, which can result in implementation errors.

Figure 3:
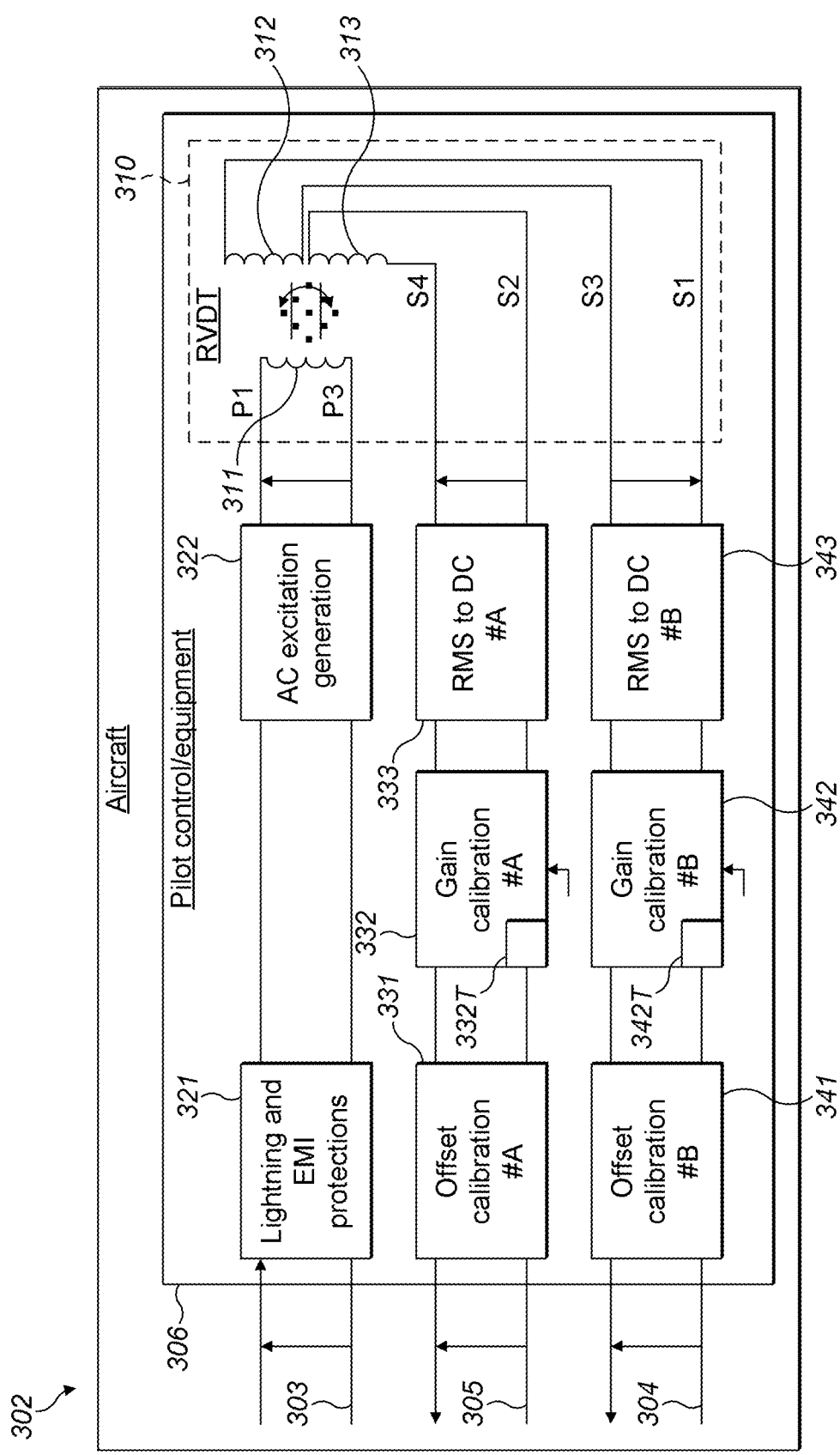
FIG. 3 shows an example of a new type of position sensing system as described herein.

FIG. 3 provides an improved position sensing system 302 which may be used instead of traditional potentiometer arrangements. Such an improved position sensing system 302 may utilise the contactless measurement of a VDT (in this example an (RVDT)) 310 in a minimised envelope with a potentiometer interface such that the position sensing system 302 may be provided collocated with the pilot control/equipment 306, such as a side stick unit in an aircraft or other vehicle. It is also envisaged that the improved sensing system 302 may be used with other equipment. The RVDT 310 shown in the FIG. 3 may be a standard RVDT that is known in the art, however, the circuitry shown in FIG. 3 conditions the inputs and outputs to and from the RVDT in a different way to what is currently known in the art, as described below.

As described above, a RVDT may comprise two AC signal output means, each configured to provide an AC voltage output signal, $V_{AC}A$ and $V_{AC}B$ respectively. In contrast to known RVDTs, however, in the new examples described herein, the position sensors 302 do not use these two voltage output signals $V_{AC}A$ and $V_{AC}B$ to calculate a ratiometric gain by consolidating both of these voltages into a single position output. Instead, the examples described herein condition these two voltage outputs $V_{AC}A$ and $V_{AC}B$ in such a way as to provide two different DC output signals, each of which represent different positions of a component, the position of which is being monitored.

For example, in the new examples described herein, an initial DC voltage may be supplied to the position sensing system 302 through an input 303. This DC voltage may be supplied by a dedicated power supply, an existing potentiometer input voltage, or by other means. Due to this, the proposed position sensing systems 302 described herein may therefore be retrofitted to a pilot control/equipment, by replacing an existing known potentiometer, as it is able to use the same input.

In some examples described herein, and as shown in FIG. 3, the circuitry of the position sensing system 302 may also have RVDT input conditioning means wherein the input DC voltage that is supplied to the position sensing system 302 and the RVDT 310 may be conditioned by first being provided through a protective device(s) such as a lightning and electromagnetic interference protection unit 321. The input DC voltage may further be conditioned by the use of an AC excitation generation unit 322. This AC excitation unit 322 may therefore condition the input to provide AC excitation for its input into the RVDT 310 through input lines P1 and P3 as shown in FIG. 3.

The RVDT that is used may be a known RVDT. This AC excitation current is therefore provided to the primary coil 311 of the RVDT, thereby generating a magnetic field. As discussed above, a rotating iron core acts as a flux director that electromagnetically couples the primary coil 311 to a first secondary coil 312 and a second secondary coil 313. As the iron core (which may be operatively connected to the pilot control/equipment 306) rotates, the iron core acts as a flux diverter, which results in a variation in the amount of AC voltage $V_{AC}A$ induced in secondary coil 313 and a variation in the amount of AC voltage $V_{AC}B$ induced in secondary coil 312.

As described above, known systems use these AC voltages generated by each of the first and second secondary coils in an RVDT to calculate a ratiometric gain in order to determine a position as shown in FIG. 2.

In contrast to this, however, the examples described herein comprise further output conditioning means 304, 305, 333, 343, 332, 342, 331, 341 that allow the RVDT 310 to be used as a dual redundant sensor, e.g. by conditioning the AC output of each of the first and second secondary coils 312, 313 of the RVDT 310 to produce two separate DC signal outputs that each represent an independent position measurement. In this regard, and as shown in FIG. 3, in the new examples described herein, both of the first secondary coil 312 and second secondary coil 313 of the RVDT 310 may be connected to independent circuits 305 and 304 respectively, (which in FIG. 3 are identical), thereby providing two separate DC output signals, each of which represent the position of the shaft of the RVDT 310. When the shaft is connected to a component of a unit, such as a pilot control unit, the position of the shaft therefore also indicates the position of the component in the pilot control unit that is being measured.

As can be seen in FIG. 3, in order to provide such DC output signals, the first circuit 305 converts the generated AC voltage $V_{AC}A$ from the first secondary coil 313 across output lines S4 and S2 into a DC output signal $V_{DC}A$ representing the position of the shaft of the RVDT 302 (and therefore the position of the pilot control unit).

This is achieved by the generated AC output signal provided by AC signal output means, AC voltage $V_{AC}A$ that is induced in the first secondary coil 313 being provided to a RMS (Root Mean Square) to DC converter 333, to thereby provide a DC voltage representing the magnitude of the induced AC voltage.

In some examples, each DC output voltage may then be calibrated. For example, in order to calibrate for a variation in temperature, (which can otherwise effect the output of position sensing system 302), the output of the RMS to DC converter 333 may be connected to a gain calibration unit 332 that comprises a thermistor 332T. This thermistor may adjust the output gain of the generated DC voltage to compensate for the effect of temperature.

Further, an offset calibration unit 331 may also be used to provide further scaling to the DC output signal. Gain calibration unit 332 and offset calibration unit 331 may be implemented by a digital potentiometer (for example, a digipot, E2pot etc.) in order to adjust the gain of the first (and second secondary) coil 313 to leverage production constrains on the RVDT 310, as well as minimize the RVDT 310 volume and cost. Further, by providing such an offset calibration, it is possible to adjust the zero position of the output of the position sensing system "electrically" to leverage side stick unit rigging time. In addition, since the position offset of the proposed position sensing system 302 may be adjusted electrically using an implemented digital potentiometer offset calibration unit 331, 341, the price and envelope of multiplex RVDTs may be minimized.

The first output circuit 305, utilising the above features may therefore provide a resulting DC voltage $V_{DC}A$ that corresponds to a first independent output signal presented by a classical potentiometer position sensor.

As shown in FIG. 3, the position sensing system 302 also comprises at least a second fully independent circuit 304 that may be similar or identical to that of the first output circuit 305. That is the second output circuit 304 is also configured to convert the output AC voltage $V_{AC}B$ (induced by the second secondary circuit 312) to a DC voltage output across output lines S3 and S1 and via the RMS to DC converter 343.

In some examples, the resulting DC voltage output signal may also be further conditioned in the same way as the first circuit 305, that is, through the use of a similar gain calibration unit 342 (and thermistor 342T), and/or offset calibration unit 341 to thereby provide a DC voltage $V_{DC}B$ that corresponds to a second independent output presented by a classical potentiometer position sensor.

In the example shown in FIG. 3, the circuits 304 and 305 are identical, however, in some examples, these output conditioning circuits 304, 305 may not be identical, and one or more of the units may be omitted from one or all of the conditioning circuits 304, 305.

Additionally, it is envisaged that although the examples are given with respect to a RVDT, the RVDT may alternatively be a duplex, triplex, or any other VDT presenting additional outputs on a single shaft. For example, a duplex RDVT presenting two outputs on a single shaft may be utilised. In such an embodiment, a position sensing system may be provided with four conditioning circuits, and thereby provide four DC position outputs on a single duplex RVDT. In general, the cost of a duplex RVDT is more than twice the cost of a single RVDT, owing to the fact that the position phasing between the 2 RVDTs is difficult and time consuming. In addition, to allow for such position phasing, the housing of duplex RDVT is bigger.

In general, it may be said that the position sensors 302 proposed herein may provide twice as many position output signals as conventional RVDT position sensors.

Further, as can be seen in FIG. 2, the output voltage of each secondary coil is within a given range. Therefore, for maintenance, it is possible to simply check that the output voltages are in the expected range. Should the output voltages fall outside the expected range, an error in the system may be identified. Other monitoring techniques may comprise summing the DC voltages of a given sensor (at the output of the RMS to DC converter) in order to check that the sum of (Va+Vb) is constant. It is envisaged that such monitoring techniques may be applied alone, together or in combination with other monitoring techniques. Further, the position sensors 302 described herein may also utilise linear variable differential transformers, LVDTs, as opposed to RVDTs. LVDTs operate in a similar manner to RVDTs but linearly and not rotary.

The proposed position sensing system 302 provides several advantages over known systems. The position sensing system 302 may be provided with a smaller, more compact package that traditional position sensors. The position sensing system 302 possesses better reliability, as the position sensing system utilises a contactless sensor, thereby preventing any track degradation. Further, the proposed sensing system utilises half the number of RVDTs as known methods, which results in a lower cost. The proposed position sensing system 302 may also be provided with an identical mechanical interface with identical DC inputs and outputs as known existing potentiometer position sensors, and thereby may be easily integrated into current systems.

As both the presented input and the presented output to the RVDT (i.e. without the additional conditioning means and circuitry) may be equivalent to known potentiometers, it is envisaged that the position sensors 302 described herein may therefore be retrofitted to existing systems utilising known position sensors without having to modify the systems to operate with different inputs and outputs.

The invention claimed is:

1. A position sensing system for sensing a position of an input shaft of a variable differential transformer (VDT) comprising:
    said VDT comprising a primary coil configured to provide a magnetic field, and first and second secondary coils electromagnetically coupled to the primary coil, and wherein movement of said input shaft varies an AC voltage induced in each of the secondary coils, said varied induced AC voltages thereby indicating said positions of said shaft;
    wherein the first secondary coil is connected to a first output circuit with a first AC/DC converting means configured to convert the AC voltage induced in the first secondary coil to a first DC output signal, and
    wherein the second secondary coil is connected to a second output circuit with a second AC/DC converting means configured to convert the AC voltage induced in the second secondary coil to a second DC output signal;
    wherein said first and second DC output signals each indicate an individual position of said input shaft, and wherein the first DC output signal is provided to a first independent output, and the second DC output signal is provided to a second independent output.

2. The position sensing system of claim 1, wherein each of the first and second AC/DC converting means configured to output said first and second DC output signals comprises a RMS to DC convertor.

3. The position sensing system of claim 1, comprising a DC input connected to said VDT.

4. The position sensing system of claim 3, further comprising a lightning and electromagnetic interference protection unit connected between said DC input and said VDT.

5. The system of claim 3, further comprising an AC excitation generation unit positioned between said DC input and said VDT, and configured to condition said DC input to provide AC excitation to said VDT.

6. The system of claim 1, wherein each output circuit further comprises a gain calibration unit.

7. The system of claim 6, wherein each gain calibration unit is operatively connected to a thermistor to adjust the output gain of the gain calibration unit.

8. The system of any of claim 7, wherein each output circuit further comprises an offset calibration unit.

9. A pilot control unit comprising:
    the position sensing system of claim 1;

wherein said shaft is connected to a component of said pilot control unit, and said position of said shaft indicates a position of said component of said pilot control unit.

10. A method for detecting a position of an input shaft of a variable differential transformer (VDT), comprising a primary coil configured to provide a magnetic field, and first and second secondary coils electromagnetically coupled to the primary coil, and wherein movement of said input shaft varies an AC voltage induced by each of the secondary coils, said varied induced AC voltages thereby indicating said positions of said shaft; wherein the first secondary coil is connected to first output circuit, and wherein the second secondary coil is connected to a second output circuit; said method comprising:

converting with a first AC/DC converting means the AC voltage induced in the first secondary coil to a first DC output signal;

converting with a second AC/DC converting means the AC voltage induced in the second secondary coil to a second DC output signal;

providing the first DC output signal to a first independent output; and providing the second DC output signal to a second independent output wherein the first and second DC output signals each indicate an individual position of said input shaft.

11. The method of claim 10, further comprising providing a DC input to said VDT and generating an AC input from said DC input and supplying said AC input to said VDT.

12. The method of claim 10, wherein each output circuit further comprises a gain calibration unit and/or an offset calibration unit.

* * * * *